United States Patent
Sumimoto

(10) Patent No.: US 10,590,961 B2
(45) Date of Patent: Mar. 17, 2020

(54) VACUUM PUMP

(71) Applicant: SHIMADZU CORPORATION, Kyoto (JP)

(72) Inventor: Shin Sumimoto, Kyoto (JP)

(73) Assignee: Shimadzu Corporation, Kyoto (JP)

(*) Notice: Subject to any disclaimer, the term of this patent is extended or adjusted under 35 U.S.C. 154(b) by 923 days.

(21) Appl. No.: 14/383,728

(22) PCT Filed: Apr. 1, 2013

(86) PCT No.: PCT/JP2013/059961
§ 371 (c)(1),
(2) Date: Sep. 8, 2014

(87) PCT Pub. No.: WO2013/151015
PCT Pub. Date: Oct. 10, 2013

(65) Prior Publication Data
US 2015/0132109 A1 May 14, 2015

(30) Foreign Application Priority Data
Apr. 4, 2012 (JP) ................. 2012-085412

(51) Int. Cl.
F04D 29/66 (2006.01)
F04D 29/059 (2006.01)
(Continued)

(52) U.S. Cl.
CPC ........... F04D 29/668 (2013.01); F04D 19/04 (2013.01); F04D 19/042 (2013.01);
(Continued)

(58) Field of Classification Search
CPC ..................................................... F04D 29/668
(Continued)

(56) References Cited

U.S. PATENT DOCUMENTS

| 5,851,675 A * | 12/1998 | Oyagi | C03C 14/004 |
| | | | 29/724 |
| 7,703,983 B2 * | 4/2010 | Tsutsui | C08J 9/40 |
| | | | 384/276 |

(Continued)

FOREIGN PATENT DOCUMENTS

| CN | 101809292 A | 8/2010 |
| JP | 2001123253 A * | 5/2001 |

(Continued)

OTHER PUBLICATIONS

International Search Report for corresponding International Application No. PCT/JP2013/059961 dated Jun. 25, 2013.
(Continued)

Primary Examiner — Ninh H. Nguyen
Assistant Examiner — Jason Mikus
(74) Attorney, Agent, or Firm — Renner, Otto, Boisselle & Sklar, LLP

(57) ABSTRACT

A vibration control mechanism 50 is interposed between a ball bearing 8 and a support section 2a of a base 2. The vibration control mechanism 50 is provided with a plurality of laminated sliding members 51, 52 and an elastic body 53. The vibration control mechanism 50 is provided with the plurality of sliding members 51, 52, and therefore has a plurality of sliding surfaces. As a result, it is possible to enhance a vibration control effect.

10 Claims, 8 Drawing Sheets

FIRST EMBODIMENT

(51) Int. Cl.
 *F04D 19/04* (2006.01)
 *F16C 27/04* (2006.01)
 *F16C 27/06* (2006.01)
 *F04D 29/056* (2006.01)
 *F04D 29/058* (2006.01)
 *F16C 19/06* (2006.01)

(52) U.S. Cl.
 CPC ......... *F04D 29/056* (2013.01); *F04D 29/058* (2013.01); *F04D 29/059* (2013.01); *F16C 27/04* (2013.01); *F16C 27/066* (2013.01); *F16C 19/06* (2013.01); *F16C 2360/45* (2013.01)

(58) Field of Classification Search
 USPC .......................................................... 415/90
 See application file for complete search history.

(56) References Cited

U.S. PATENT DOCUMENTS

| | | |
|---|---|---|
| 2006/0245960 A1 | 11/2006 | Schooling et al. |
| 2010/0215475 A1 | 8/2010 | Brewster et al. |
| 2011/0081231 A1* | 4/2011 | Hoelzer ................ F04D 19/042 415/119 |

FOREIGN PATENT DOCUMENTS

| | | |
|---|---|---|
| JP | 2006-300210 | 11/2006 |
| JP | 2006-525466 | 11/2006 |
| JP | 2006300210 A * | 11/2006 |
| JP | 2008-542628 | 11/2008 |
| JP | 2010-535969 | 11/2010 |
| WO | WO 2004/099622 A1 | 11/2004 |

OTHER PUBLICATIONS

English translation of Chinese Office Action and Search Report dated Dec. 4, 2015 for corresponding Chinese Application No. 201380005388.8.
English translation of Notice of Reasons for Rejection dated Dec. 15, 2015 for corresponding Japanese Application No. 2014-509156.
English translation of Chinese Office Action dated Apr. 5, 2016 for corresponding Chinese Application No. 201380005388.8.
Japanese Office Action for corresponding Japanese Application No. 2014-509156 dated Jun. 2, 2015 (with English translation).
English translation of Chinese Office Action dated Aug. 22, 2016 for corresponding Chinese Application No. 201310671260.7.

* cited by examiner

FIRST EMBODIMENT

SECOND EMBODIMENT

THIRD EMBODIMENT

THIRD EMBODIMENT

66

MODIFICATION OF THIRD EMBODIMENT

FOURTH EMBODIMENT

FIFTH EMBODIMENT

VACUUM PUMP

TECHNICAL FIELD

The present invention relates to a vacuum pump that uses a permanent magnet and a ball bearing as a bearing.

BACKGROUND ART

As a bearing mechanism for a rotor in a vacuum pump such as a turbo-molecular pump, there is one having a structure that uses a permanent magnet and a ball bearing. The rotational frequency of a rotor of a turbo-molecular pump is higher than the resonant frequency (the secondary critical speed) of a rotor body. Therefore, it is necessary to allow the rotational frequency of the rotor to pass through the resonant frequency (critical speed) when starting and stopping the pump. Therefore, a vibration control mechanism for damping the transmission of vibration caused by resonance of the rotor to a housing is required in the turbo-molecular pump.

A typical vibration control mechanism in a structure that uses a permanent magnet and a ball bearing is illustrated in FIG. 1 of Patent Document 1. In this structure, in order to damp the movement in the radial direction of a ball bearing which is attached to a rotor shaft, a radial-direction damping elastomer ring is interposed between the outer peripheral surface of an outer peripheral ring of the ball bearing and a housing section. Further, in order to damp the movement in the axial direction of the ball bearing, an axial-direction damping elastomer ring is interposed between the end surface of the outer peripheral ring of the ball bearing and the housing.

PRIOR ART DOCUMENT

Patent Document

Patent Document 1: JP 2008-542628 W

SUMMARY OF THE INVENTION

Problems to be Solved by the Invention

As described above, the vibration control mechanism for the axial direction of the rotor shaft is configured by merely interposing the axial-direction damping elastomer ring between the end surface of the outer peripheral ring of the ball bearing and the housing. In a turbo-molecular pump that supports a rotor using a permanent magnet and a ball bearing, a rotor body largely whirls at the position of the permanent magnet when passing through the critical speed. Therefore, in a conventional vibration control mechanism, a damping effect is not sufficient and the vibration in a housing is therefore large. Thus, a vacuum pump having a more effective vibration control mechanism is needed.

Solutions to the Problems

According to the first embodiment of the present invention, a vacuum pump whose rotor including an exhaust function section is supported by a ball bearing and a permanent magnet type magnetic bearing and rotated at high speed by a motor to perform evacuation comprises: a shaft provided in the rotor; a ball bearing attached to the shaft; a support member arranged between the ball bearing and the permanent magnet type magnetic bearing in an axial direction of the shaft; and a vibration control mechanism interposed between the support member and the ball bearing. The vibration control mechanism includes: an elastic body interposed between the support member and the ball bearing, and a plurality of laminated sliding members interposed between the elastic body and the ball bearing.

According to the second embodiment of the present invention, in the vacuum pump of the first embodiment, preferably the sliding members include at least two kinds of sliding members surfaces of which are formed of different materials.

According to the third embodiment of the present invention, in the vacuum pump of the second embodiment, preferably at least a surface of one of the two kinds of sliding members is formed of a metal material and at least a surface of the other sliding member is formed of a polymer material.

According to the fourth embodiment of the present invention, in the vacuum pump of the third embodiment, preferably one of the sliding members is formed of sintered metal powder and the sintered metal powder is impregnated with lubrication oil.

According to the fifth embodiment of the present invention, in the vacuum pump of the third or fourth embodiment, preferably the polymer material is any one of fluororesin, polyimide, PEEK, and phenol resin.

According to the sixth embodiment of the present invention, in the vacuum pump of any one of the third to fifth embodiment, preferably the polymer material is impregnated with lubrication oil.

According to the seventh embodiment of the present invention, in the vacuum pump of the third embodiment, preferably a plurality of sliding members at least surfaces of which are formed of the metal material and a plurality of sliding members at least surfaces of which are formed of the polymer material are alternately laminated.

According to the eighth embodiment of the present invention, in the vacuum pump of the seventh embodiment, preferably at least a surface of one of the sliding members, the one having contact with the ball bearing, is formed of the polymer material and at least a surface of one of the sliding members, the one having contact with the elastic body, is formed of the metal material.

According to the ninth embodiment of the present invention, in the vacuum pump of the first embodiment, preferably the sliding members include at least one sliding member that is formed of sintered metal powder impregnated with lubrication oil.

According to the tenth embodiment of the present invention, in the vacuum pump of the ninth embodiment, preferably all of the sliding members are formed of a sintered metal powder material.

Effect of the Invention

In the present invention, the vibration control mechanism is provided with the elastic body and the plurality of laminated sliding members. The sliding members relatively slide on a plurality of sliding surfaces including the contact surface with the ball bearing and the contact surface between the sliding members. Therefore, a large vibration control effect can be obtained.

EMBODIMENTS OF THE INVENTION

First Embodiment

Figure 1:
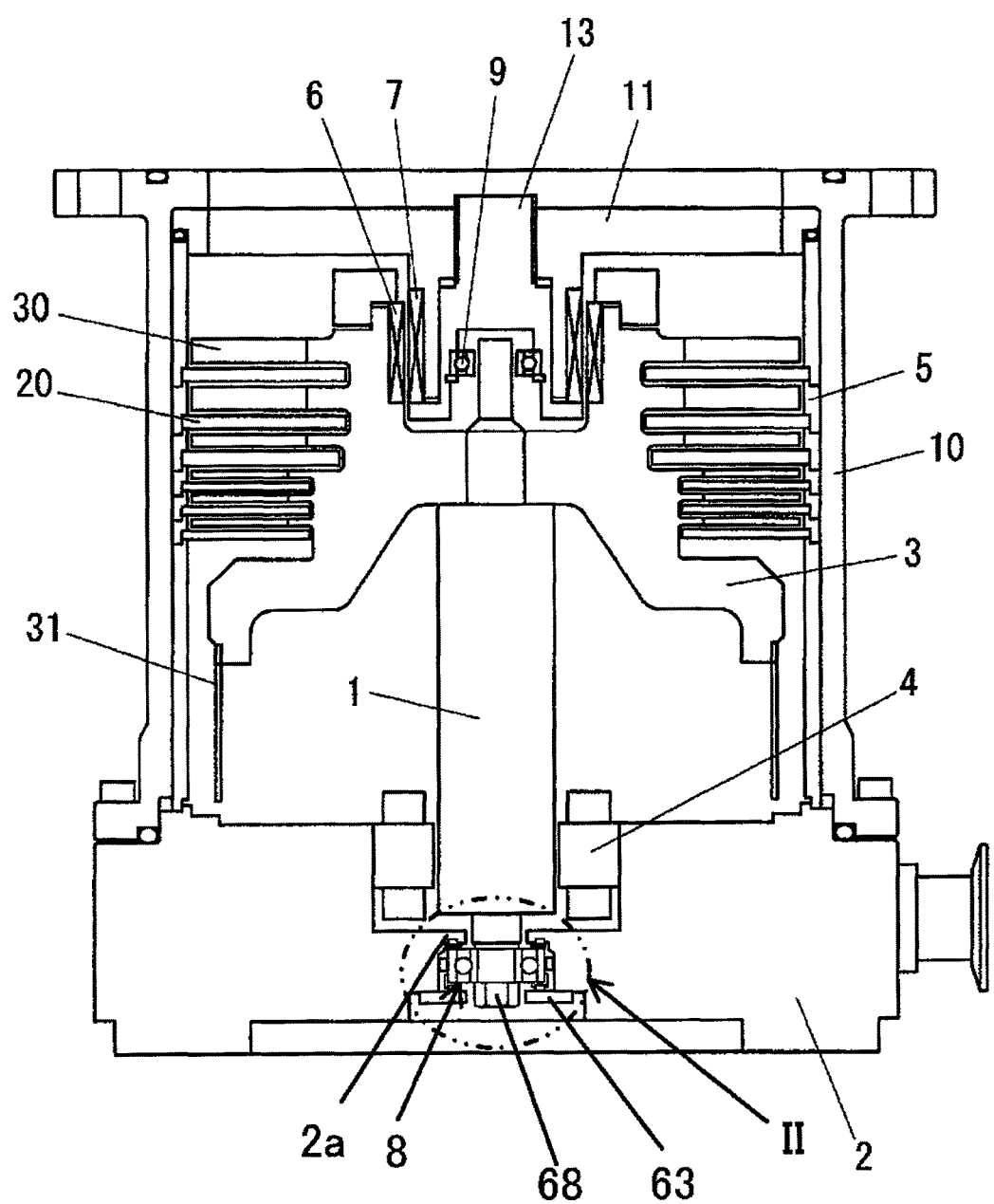
FIG. 1 is a cross-sectional view illustrating a turbo-molecular pump according to an embodiment.

Hereinbelow, embodiments of the present invention will be described with reference to the drawings. FIG. 1 is a diagram illustrating a vacuum pump according to an embodiment of the present invention, specifically, a cross-sectional view of a turbo-molecular pump. Rotor blades 30 and a cylindrical section 31 are formed in a rotor 3 as an exhaust function section. Stationary blades 20 are positioned by spacer rings 5 and provided inside a case 10 so as to correspond to the rotor blades 30. The rotor blades 30 and the stationary blades 20 together constitute a high vacuum side exhaust function section. Further, although not illustrated in FIG. 1, a fixed cylinder is provided inside the case 10 so as to correspond to the cylindrical section 31. The fixed cylinder and the cylindrical section 31 together constitute a low vacuum side exhaust function section such as a screw groove exhaust section.

A base 2 is attached to the lower surface of the case 10 with a fastening member (not illustrated) with a seal member interposed therebetween. The case 10 and the base 2 together constitute a housing sealed from the outside. A shaft 1 is housed inside the housing with its shaft center coinciding with the center part of the housing. The rotor 3 is coaxially fastened with the shaft 1. The shaft 1 is driven to rotate by a motor 4. The rotor 3 with which the shaft 1 is fastened is rotatably supported by a magnetic bearing which uses permanent magnets 6, 7 and a ball bearing 8. The permanent magnet 6 which has a cylindrical shape is fixed to the rotor 3. On the other hand, the permanent magnet 7 on the fixed side is held by a magnet holder 11, and arranged to face the inner peripheral side of the permanent magnet 6. The permanent magnets 6, 7 constitute a permanent magnet type magnetic bearing. The ball bearing 8 is a grease lubrication type bearing.

The magnet holder 11 is fixed to a flange section of the case 10. In the example illustrated in FIG. 1, a beam section of the magnet holder 11 and the spacer rings 5 which position the stationary blades 20 are held so as to be sandwiched between the flange section of the case 10 and the base 2. A bearing holder 13 which holds a ball bearing 9 is fixed to the center of the magnet holder 11.

The ball bearing 9 is provided for restricting the swing in the radial direction of the upper part of the shaft 1. A gap is formed between an inner ring of the ball bearing 9 and the shaft 1. The dimension of the gap is set to be smaller than the dimension of a gap between the permanent magnets 6, 7.

This prevents the permanent magnets 6, 7 from making contact with each other when the rotor 3 whirls at the time of passing through the critical speed.

The ball bearing 8 is attached to the lower end of the shaft 1. A vibration control mechanism 50 which is specifically illustrated in FIG. 2 is interposed between the ball bearing 8 and a support section (support member) 2a of the base 2.

Figure 2:
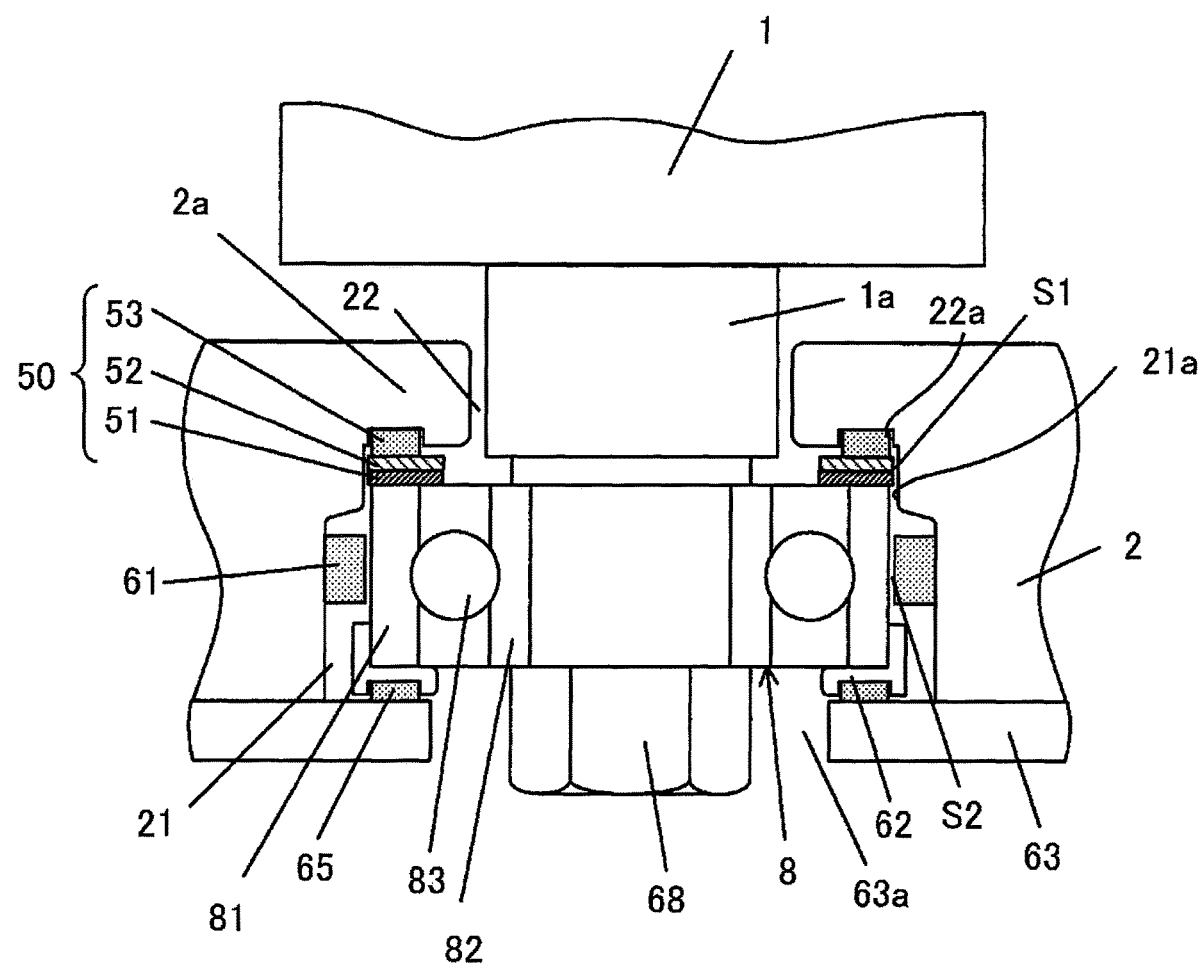
FIG. 2 is an enlarge view of an area II in FIG. 1.

FIG. 2 is an enlarged view of an area II indicated by a two-dot chain line in FIG. 1. A bearing housing section 21 is formed in the base 2 so as to correspond to the shaft 1. The support section 2a of the base 2 is formed to close the upper side of the bearing housing section 21. A through hole 22 is formed on the support section 2a, and a shaft lower end section 1a of the shaft 1 is inserted into the bearing housing section 21 through the through hole 22. The ball bearing 8 is arranged inside the bearing housing section 21 and attached to the shaft lower end section 1a formed on the lower end of the shaft 1. As the ball bearing 8, for example, an angular contact ball bearing is used. The ball bearing 8 includes an outer ring 81, an inner ring 82, and a rolling element 83 which is arranged between the outer ring 81 and the inner ring 82. Grease for reducing friction with the inner surfaces of the outer ring 81 and the inner ring 82 is applied to the entire surface of the rolling element 83.

The vibration control mechanism 50 which is interposed between the ball bearing 8 and the support section 2a of the base 2 is provided with two laminated sliding members 51, 52 and an elastic body 53 which is formed of rubber, elastomer or the like. The elastic body 53 is formed in a ring-like shape, and the upper side of the elastic body 53 is engaged into a recess 22a formed on the support section 2a.

The sliding members 51, 52 are each formed in a ring-like shape. The sliding member 51 is arranged on the upper surface of the outer ring 81 of the ball bearing 8. The sliding member 52 is arranged on the upper surface of the sliding member 51. The sliding members 51, 52 are formed of different materials. For example, the sliding member 51 which is arranged in contact with the upper surface of the ball bearing 8 is formed of, but not limited to, a polymer material, and the sliding member 52 which is interposed between the sliding member 51 and the elastic member 53 is formed of, but not limited to, a metal material. Examples of the polymer material include fluororesin such as Teflon (registered trademark), polyimide resin, polyetheretherketone (PEEK) resin, and phenol resin. Further, the polymer material may be impregnated with lubrication oil. Grease is applied between the upper surface of the ball bearing 8 and the sliding member 51. The grease is not necessarily required, and may not be applied.

A slight space S1 is provided between the outer peripheries of the sliding members 51, 52 and a peripheral wall surface 21a of the bearing housing section 21 of the base 2. The sliding member 51 slides on the upper surface of the ball bearing 8, and is slidable on the sliding member 52.

An elastic member 61 is provided in the bearing housing section 21 so as to correspond to the outer ring 81 of the ball bearing 8. The elastic member 61 is formed of rubber, elastomer or the like into a ring-like shape. The elastic member 61 is formed to have a dimension that allows a slight space S2 to be formed between the inner surface of the elastic member 61 and the outer peripheral surface of the outer ring 81 of the ball bearing 8.

A cylindrical holding member 62 is fitted with the lower surface and the outer peripheral surface of the outer ring 81 of the ball bearing 8. An attachment member 63 which projects inside the bearing housing section 21 is attached to the base 2 with a fastening member (not illustrated) or the like. A ring-like elastic body 65 which is made of rubber, elastomer or the like is interposed between the cylindrical holding member 62 and the attachment member 63. The ball bearing 8 is fixed to the shaft lower end section 1a of the shaft 1 with a nut 68 which is inserted through a through hole 63a formed on the attachment member 63.

The shaft 1 is held at a predetermined position in the axial direction with respect to the magnet holder 11, that is, the case 10 by repulsion between the permanent magnet 6 fixed to the rotor 3 and the permanent magnet 7 held by the magnet holder 11. In this state, the elastic body 53 is compressed into a flat shape.

When the rotor 3 rotates at high speed, the ball bearing 8 whirls together with the shaft 1 attached to the rotor 3 due to unbalance of the rotor 3. The swing in the radial direction of the ball bearing 8 is suppressed by the outer peripheral surface of the outer ring 81 of the ball bearing 8 making contact with the elastic member 61. That is, the elastic member 61 has a radial-direction vibration control function for suppressing the vibration in the radial direction of the rotor 3.

The ball bearing 8 swings both in the radial direction and the axial direction. When the ball bearing 8 whirls in this manner, the sliding member 51 slides relative to the upper surface of the outer ring 81 of the ball bearing 8. Further, the sliding member 52 slides relative to the sliding member 51. That is, a contact surface between the upper surface of the outer ring 81 of the ball bearing 8 and the sliding member 51 and a contact surface between the sliding member 51 and the sliding member 52 serve as sliding surfaces. Because sliding occurs in the plurality of sliding surfaces in this manner, an effect of damping the vibration generated in the rotor 3 is enhanced. The elastic member 65 which is interposed between the cylindrical holding member 62 and the attachment member 63 has a function of absorbing and controlling the vibration when the load of the rotor 3 acts downward in the axial direction due to some abnormality.

The friction coefficient between a polymer material and a metal material is smaller than the friction coefficient between polymer materials or between metal materials. Therefore, when the outer ring 81 of the ball bearing 8 is formed of a metal material, the friction coefficient between the ball bearing 8 and the sliding member 51 can be reduced by forming the sliding member 51 arranged on the upper surface of the ball bearing 8 with a polymer material. Further, when the sliding member 52 is formed of a metal material, the friction coefficient between the sliding member 51 and the sliding member 52 can be reduced. As a result, a vibration control effect for preventing the vibration of the rotor 3 from being transmitted to the base 2 and the case 10 can be further enhanced.

Therefore, even when the whirling of the rotor 3 becomes large when passing through the critical speed, it is possible to sufficiently absorb vibration energy transmitted to the base 2 and the case 10 through the ball bearing 8. In other words, it is possible to improve the vibration control effect. The vibration control action can be obtained also at a rotation speed other than the rotation speed when the rotor 3 passes through the critical speed, that is, at the time of constant speed rotation. Also in such a case, a large vibration control effect can be obtained in the same manner as above.

When lubrication oil lies on the interface between the upper surface of the ball bearing 8 and the sliding member 51, it is possible to reduce the friction coefficient between the ball bearing 8 and the sliding member 51. Further, disposing the plurality of sliding members 51, 52 in an laminated manner improves the vibration control effect even when lubrication oil does not lie on the interface between the upper surface of the ball bearing 8 and the sliding member 51 compared to the case where the sliding members 51, 52 are not provided.

In particular, as described above, the frictional coefficient on the sliding surface can be made smaller when the sliding members 51, 52 are formed of different materials, as a preferred example, one of the sliding members 51, 52 is formed of a metal material and the other one of the sliding members 51, 52 is formed of a polymer material than when the sliding members 51, 52 are formed of the same material. In this case, when both of the sliding members 51, 52 are formed of a polymer material, the frictional resistance increases. In addition, a polymer material has poor thermal conductivity. Therefore, it should be noted that the sliding members 51, 52 are likely to adhere to each other due to friction heat. However, even in this case, the vibration control effect is higher than the structure that does not include the sliding members 51, 52. Further, the sliding member 51 and the sliding member 52 may be respectively formed of a metal material and a polymer material, or both of the sliding members 51, 52 may be formed of a metal material.

Second Embodiment

Figure 3:
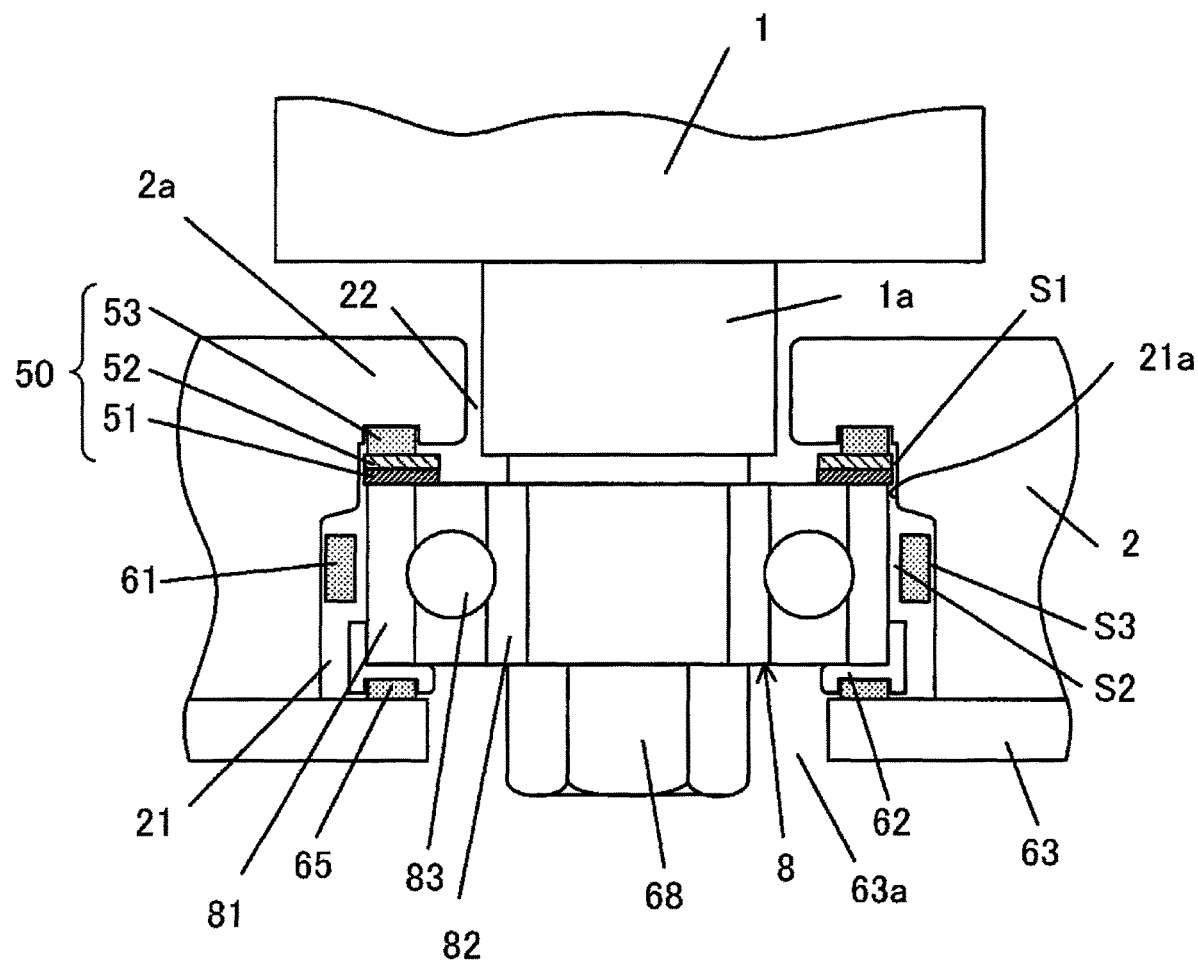
FIG. 3 is a cross-sectional view illustrating a vibration control mechanism in a vacuum pump according to a second embodiment of the present invention.

FIG. 3 is a cross-sectional view illustrating a vibration control mechanism in a vacuum pump according to a second embodiment of the present invention. The vibration control mechanism in the second embodiment differs from the vibration control mechanism in the first embodiment illustrated in FIG. 2 in that a space is formed around an elastic member 61 and lubrication oil is injected into the space. More specifically, a space S3 is formed between the peripheral wall surface of a bearing housing section 21 and the outer peripheral surface of the elastic member 61, and lubrication oil is injected into the space S3. Further, a space S2 between the outer peripheral surface of an outer ring 81 of a ball bearing 8 and the inner peripheral surface of the elastic member 61 is made larger than the space S2 in the first embodiment, and lubrication oil is injected into the space S2.

The lubrication oil injected into the spaces S3 and S2 acts as an oil damper when the ball bearing 8 vibrates in the radial direction. In other words, the lubrication oil injected into the spaces S3 and S2 fulfils a vibration control function together with the elastic member 61. Therefore, it is possible to improve a vibration control effect. The dimension of the space S3 may be approximately 0.1 to 0.2 mm. Only either one of the spaces S3, S2 into which lubrication oil is injected may be provided. The other configurations are the same as those of the first embodiment. Therefore, corresponding members are designated by the same reference numerals, and description thereof will be omitted.

Third Embodiment

Figure 4:
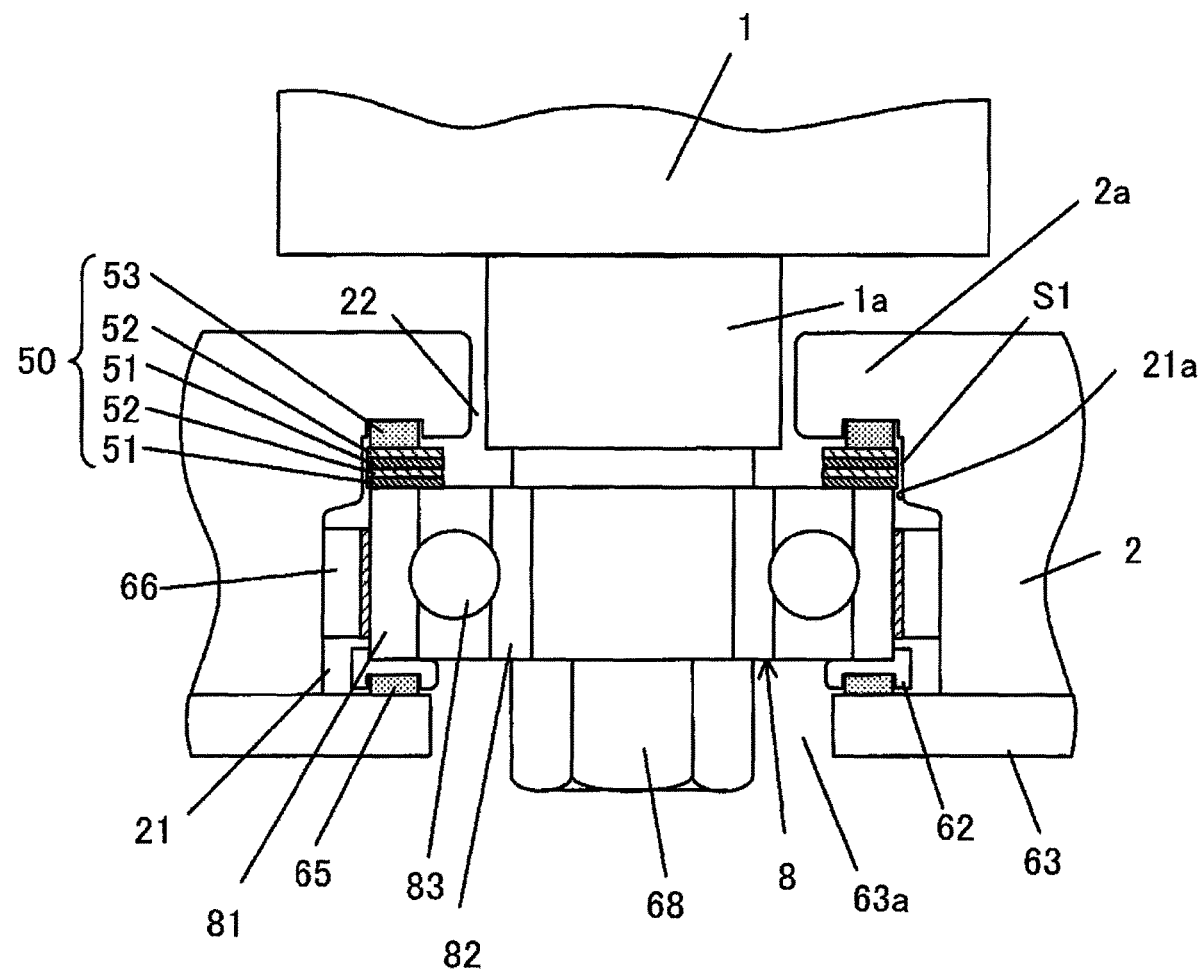
FIG. 4 is a cross-sectional view illustrating a vibration control mechanism in a vacuum pump according to a third embodiment of the present invention.
Figure 5:
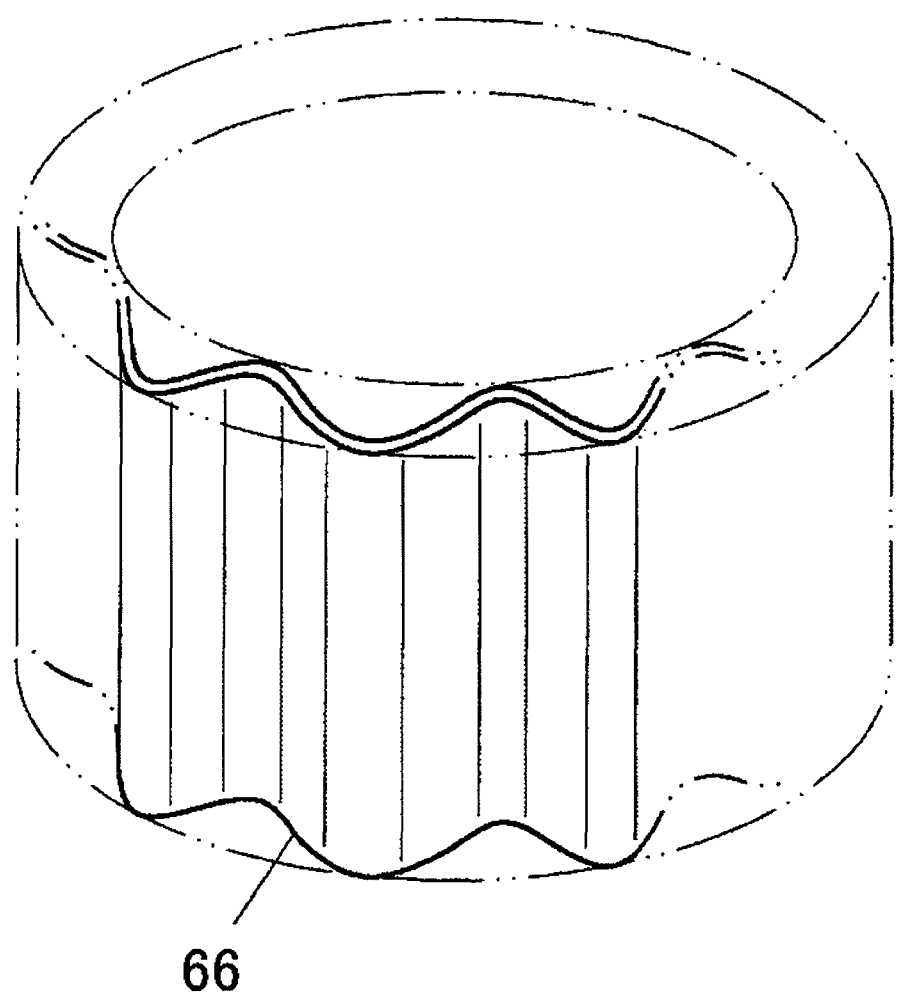
FIG. 5 is a perspective view illustrating the appearance of an elastic member used in the vibration control mechanism illustrated in FIG. 4.

FIG. 4 is a cross-sectional view illustrating a vibration control mechanism in a vacuum pump according to a third embodiment of the present invention. FIG. 5 is a perspective view illustrating the appearance of an elastic member used in the vibration control mechanism illustrated in FIG. 4. Hereinbelow, the vibration control mechanism in the third embodiment, mainly differences from the first embodiment, will be described. A vibration control mechanism 50 of the third embodiment includes a single elastic body 53 and four sliding members 51, 52. More specifically, in the vibration control mechanism 50, two sliding members 51 and two sliding members 52 are alternately laminated. The lamination order of the sliding members 51, 52 is the same as that of the first embodiment. Specifically, a ball bearing 8, the sliding member 51, the sliding member 52, the sliding member 51, and the sliding member 52 are laminated in this order.

In this structure, four sliding surfaces are provided, and the number of sliding surfaces is therefore larger than that in the first embodiment. As a result, the vibration control effect can be further improved. As illustrated in FIG. 5, an elastic member 66 has a shape in which a cylindrical metal plate is waved in the radial direction. In the elastic member 66, a part having the maximum diameter is in contact with the peripheral wall surface of a bearing housing section 21, and a part having the minimum diameter is contact with the outer peripheral surface of an outer ring 81 of the ball bearing 8.

The strength of the elastic member 66 made of metal can be made larger than an elastic member made of rubber or elastomer. Therefore, the vibration control mechanism in the third embodiment is effective particular for a vacuum pump having a large size. The height of a cylindrical holding member 62 is set to be low corresponding to the height (the length in the axial direction) of the elastic member 66. Further, lubrication oil may be applied to either one of the peripheral wall surface of the bearing housing section 21 and the elastic member 66 and/or either one of the outer peripheral surface of the ball bearing 8 and the elastic member 66. The other configurations are the same as those of the first embodiment. Therefore, corresponding members are designated by the same reference numerals, and description thereof will be omitted.

(Modification)

Figure 6:
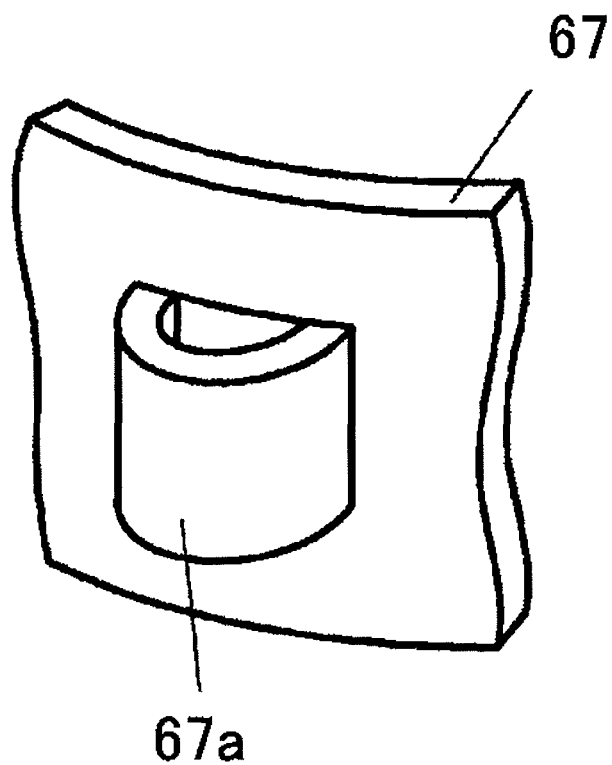
FIG. 6 is a perspective view illustrating the appearance of a modification of the elastic member illustrated in FIG. 5.

FIG. 6 is a perspective view illustrating the appearance of a modification of the elastic member illustrated in FIG. 5. An elastic member 67 made of metal has a structure in which a plurality of projections 67a each projecting in the outer peripheral direction are formed on a cylindrical metal plate. The projections 67a are arranged at predetermined intervals along the circumferential direction so that the end part of each of the projections 67a is in contact with the peripheral wall surface of the bearing housing section 21. Further, the elastic member 67 is arranged to have a positional relationship with the ball bearing 8 such that a gap S2 (see FIG. 2) is formed between the inner surface of the elastic member 67 and the outer peripheral surface of the outer ring 81 of the ball bearing 8. Lubrication oil may be applied to the inner surface of the elastic member 67 or the outer peripheral surface of the outer ring 81 of the ball bearing 8.

Fourth Embodiment

Figure 7:
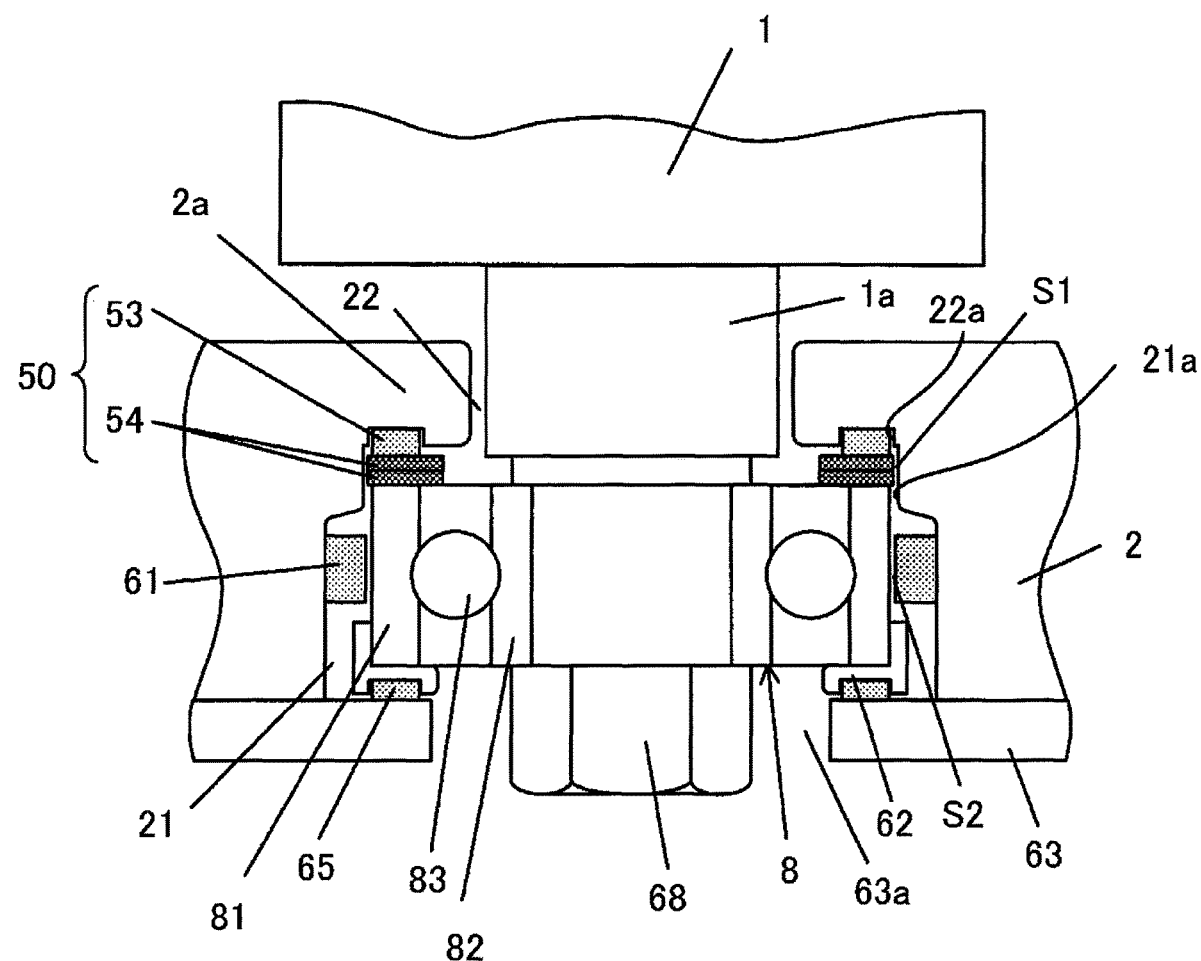
FIG. 7 is a cross-sectional view illustrating a vibration control mechanism in a vacuum pump according to a fourth embodiment of the present invention.

FIG. 7 is a cross-sectional view illustrating a vibration control mechanism in a vacuum pump according to a fourth embodiment of the present invention. In the first to third embodiments, there has been described, as an example, the structure in which one of the sliding members 51, 52 of the vibration control mechanism 50 is formed of a polymer material and the other one of the sliding members 51, 52 is formed of a metal material. A vibration control mechanism 50 in the fourth embodiment includes a plurality of sliding members 54 (two sliding members 54 in FIG. 7), and the sliding members 54 are each formed of sintered metal powder impregnated with lubrication oil.

The sliding member 51 which is formed of a polymer material is worn by friction on the sliding surface thereof. In a polymer material impregnated with lubrication oil, the lubrication oil covers the sliding surface by the wear. When the sliding member 51 is worn, the position of the permanent magnet 6 fixed to the rotor 3 is displaced downward. In other words, the distance in the thrust direction between the permanent magnet 6 and the permanent magnet 7 fixed to the magnet holder 11 changes. Therefore, the preload acting on the ball bearing 8 increases due to the repulsive force between the permanent magnet 6 and the permanent magnet 7. When the preload acting on the ball bearing 8 increases, the ball bearing 8 is damaged or the vibration increases.

Using the sliding members 54 which are each formed of sintered metal powder impregnated with lubrication oil makes it possible to suppress the wear of the sliding members 54. As a result, an increase in the preload acting on the ball bearing 8 can be suppressed. Further, the sliding members 54 each formed of sintered metal power have large heat transfer coefficient. Therefore, it is possible to improve the heat dissipation for dissipating heat through the base 2 and the case 10, and thereby lower the temperature of the ball bearing 8 and the rotor 3.

Further, the number of sliding members 54 formed of sintered metal power is not limited to two, and may be three or more. It is not necessarily required that all of the sliding members 54 be impregnated with lubrication oil, and it is only required that at least one of the sliding members 54 be impregnated with lubrication oil. Further, a radial-direction vibration control mechanism including elastic members 61, 66, and 67 may have the structure described in the second and third embodiments.

Fifth Embodiment

Figure 8:
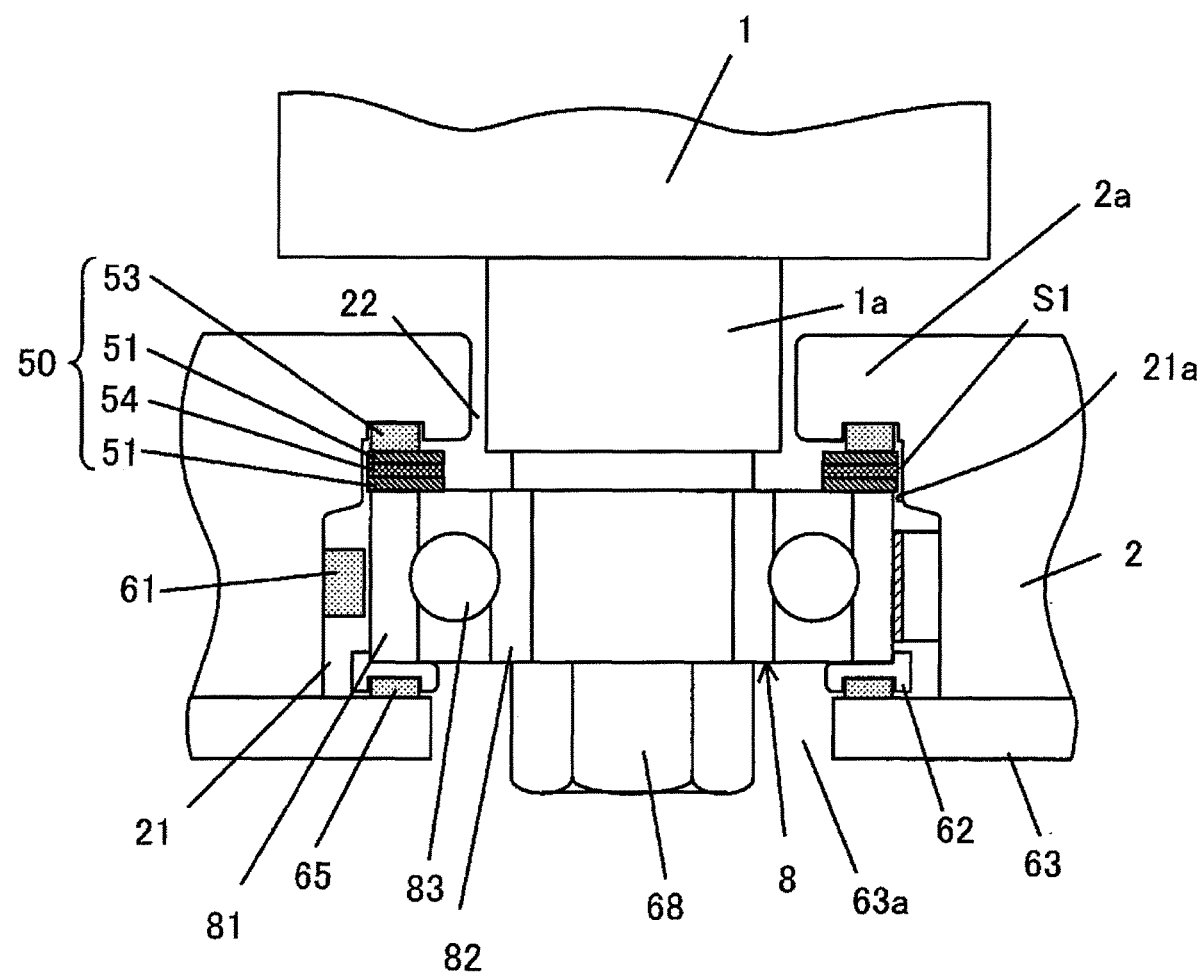
FIG. 8 is a cross-sectional view illustrating a vibration control mechanism in a vacuum pump according to a fifth embodiment of the present invention.

FIG. 8 is a cross-sectional view illustrating a vibration control mechanism in a vacuum pump according to a fifth embodiment of the present invention. In a vibration control mechanism 50 in the fifth embodiment, a sliding member 51 which is formed of a polymer material and a sliding member 54 which is formed of sintered metal powder are laminated. In FIG. 8, there is illustrated, as an example, a laminated structure in which a sliding member 54 formed of sintered metal powder is vertically sandwiched between sliding members 51 each formed of a polymer material. However, the present invention is not limited to the laminated structure illustrated in FIG. 8, and may have a laminated structure in which a sliding member 51 formed of a polymer material is vertically sandwiched between sliding members 54 each formed of sintered metal powder. Further, as in the first embodiment, a single sliding member 54 formed of sintered metal powder and a single sliding member 51 formed of a polymer material may be laminated. Further, as in the third embodiment, a plurality of sliding members 54 each formed of sintered metal powder and a plurality of sliding members 51 each formed of a polymer material may be alternately laminated.

It is not necessarily required that all of the sliding members 54 each formed of sintered metal powder be impregnated with lubrication oil. However, at least one of the sliding members 54 is preferably impregnated with lubrication oil. Further, the sliding material 51 formed of a polymer material may be impregnated with lubrication oil. The sliding member 54 formed of sintered metal powder and the sliding member 51 formed of a polymer material may have any vertical positional relationship, and any one of the sliding member 54 and the sliding member 51 may be arranged on the ball bearing 8. Further, any one of the sliding member 54 and the sliding member 51 may be allowed to have contact with an elastic body 53. Further, a radial-direction vibration control mechanism including elastic members 61, 66, and 67 may have the structure described in the second and third embodiments.

The following effects can be achieved in the above embodiments.

(1) In the first to fifth embodiments, the vibration control mechanism 50 is provided between the support section 2a and the ball bearing 8. The vibration control mechanism 50 of the first to third embodiments is provided with the elastic body 53 and the plurality of laminated sliding members 51, 52. The vibration control mechanism 50 of the fourth embodiment is provided with the elastic body 53 and the plurality of laminated sliding members 54. The vibration control mechanism 50 of the fifth embodiment is provided with the elastic body 53 and the plurality of laminated sliding members 51, 54. In the first to third embodiments, relative sliding is performed between the sliding members 51, 52 and between the sliding member 51 and the ball bearing 8. In the fourth embodiment, relative sliding is performed between the two sliding members 54, 54 and between the sliding member 54 and the ball bearing 8. In the fifth embodiment, relative sliding is performed between the sliding members 51, 54 and between the sliding member 51 and the ball bearing 8. Therefore, relative sliding is performed on a plurality of contact surfaces. As a result, a large vibration control effect can be obtained.

(2) In the third embodiment, the sliding members 51 which are each formed of a polymer material and the sliding members 52 which are each formed of a metal material are alternately laminated. Therefore, it is possible to further reduce the friction coefficient on each of the sliding surfaces, and thereby make the vibration of the rotor 3 transmitted to the base 2 and the case 10 extremely small.

(3) Laminating the sliding members 51, 52, 54 makes it possible to maintain a sufficient vibration control effect even when lubrication oil applied to the upper surface of the ball bearing 8 is wiped out due to repeated use.

(4) As described as an example in the fourth and fifth embodiments, the vibration control mechanism 50 includes at least one sliding member 54 that is formed of sintered metal powder impregnated with lubrication oil, thereby making it possible to suppress the wear on the sliding surfaces. That is, for example, it is possible to further reduce the wear on the sliding surfaces than the sliding member 51 which is formed of a polymer material. As a result, it is possible to suppress a change in the preload in the vacuum pump in which the preload acts on the ball bearing 8 due to the action of the permanent magnet type magnetic bearing.

(5) As described as an example in the fourth embodiment, only the sliding members 54 each of which is formed of sintered metal powder and has large heat transfer coefficient are used as the sliding members, thereby making it possible to improve the heat dissipation for dissipating heat through the base 2 and the case 10 and lower the temperature of the ball bearing 8 and the rotor 3.

In the above embodiments, the entire body of each of the sliding members 51, 52 is formed of a metal material or a polymer material. However, the entire body of each of the sliding members 51, 52 may not be formed of a single material, and a surface layer thereof may be formed of a different material. For example, a metal material may be coated with a polymer material, or a metal layer may be formed on ceramic by sputtering.

Further, one or both of the sliding members 51, 52 may be formed of, for example, a metal material or metal oxide, and dome-shaped smooth fine bumps for achieving smooth sliding may be formed on the surface(s) thereof.

Further, the present invention can be applied not only to a turbo-molecular pump, but also to a vacuum pump having the same bearing structure as described above such as a drag pump. In addition, the present invention is not limited at all to the above embodiments within the scope of the invention.

The disclosure of the following priority application is incorporated herein by reference.

Japanese Patent Application No. 2012-85412 (filed on Apr. 4, 2012)

The invention claimed is:

1. A vacuum pump whose rotor including an exhaust function section is supported by a ball bearing and is rotated at high speed by a motor to perform evacuation comprising:
   a shaft provided in the rotor;
   a ball bearing attached to the shaft;
   a support member arranged above the ball bearing in an axial direction of the shaft; and
   a vibration control mechanism interposed between the support member and the ball bearing, wherein
   the vibration control mechanism includes:
   an elastic body interposed between the support member and the ball bearing, and
   a first sliding member and a second sliding member laminated in an axial direction of the shaft and interposed between the elastic body and the ball bearing, wherein
   the first sliding member is arranged on an upper surface of an outer ring of the ball bearing,
   the second sliding member is arranged on an upper surface of the first sliding member,
   the first sliding member is configured to slide radially relative to the upper surface of the outer ring of the ball bearing when the ball bearing swings in the axial direction,
   the second sliding member is configured to slide radially relative to the first sliding member when the ball bearing swings in the axial direction.

2. The vacuum pump according to claim 1, wherein the sliding members include respective sliding surfaces formed of different materials.

3. The vacuum pump according to claim 2, wherein at least a surface of one of the two kinds of sliding members is formed of a metal material and at least a surface of the other sliding member is formed of a polymer material.

4. The vacuum pump according to claim 3, wherein one of the sliding members is formed of sintered metal powder and the sintered metal powder is impregnated with lubrication oil.

5. The vacuum pump according to claim 3, wherein the polymer material is any one of fluororesin, polyimide, PEEK, and phenol resin.

6. The vacuum pump according to claim 3, wherein the polymer material is impregnated with lubrication oil.

7. The vacuum pump according to claim 3, wherein a plurality of sliding members including sliding surfaces formed of the metal material and a plurality of sliding members including sliding surfaces formed of the polymer material are alternately laminated.

8. The vacuum pump according to claim 7, wherein at least a surface of one of the sliding members, the one having contact with the ball bearing, is formed of the polymer material and at least a surface of one of the sliding members, the one having contact with the elastic body, is formed of the metal material.

9. The vacuum pump according to claim 1, wherein the sliding members include at least one sliding member that is formed of sintered metal powder impregnated with lubrication oil.

10. The vacuum pump according to claim 9, wherein all of the sliding members are formed of a sintered metal powder material.

* * * * *